Aug. 27, 1957  R. W. LITTLE  2,803,924
TREE INJECTOR
Filed Jan. 4, 1955  2 Sheets-Sheet 1
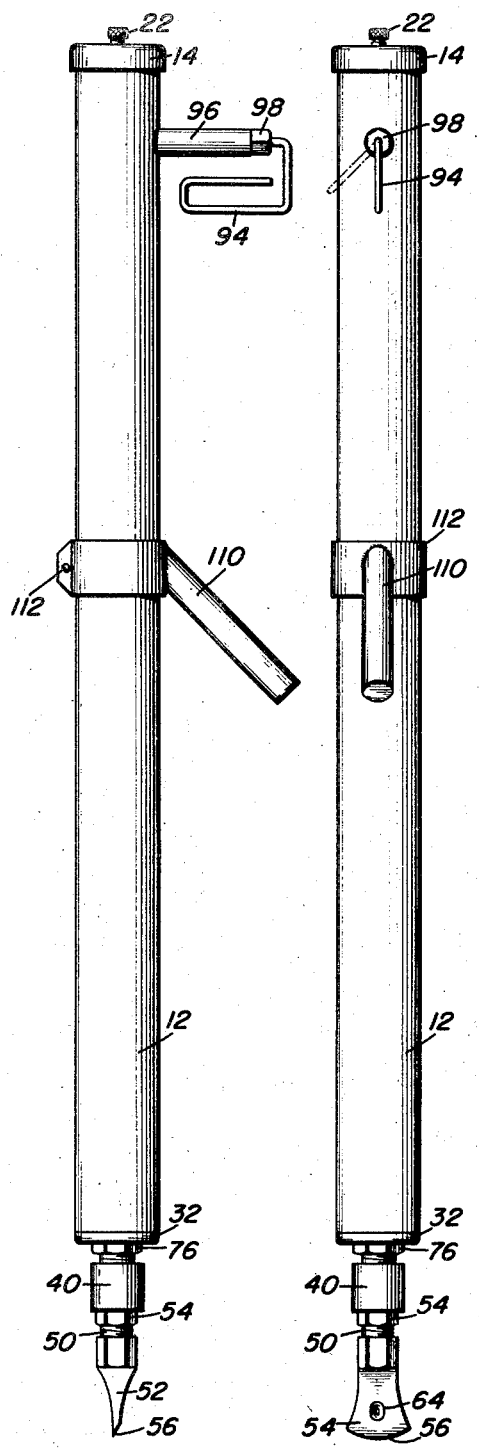
Fig. 1
Fig. 2
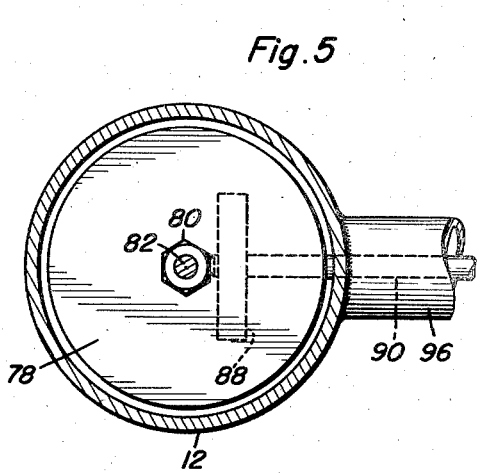
Fig. 5
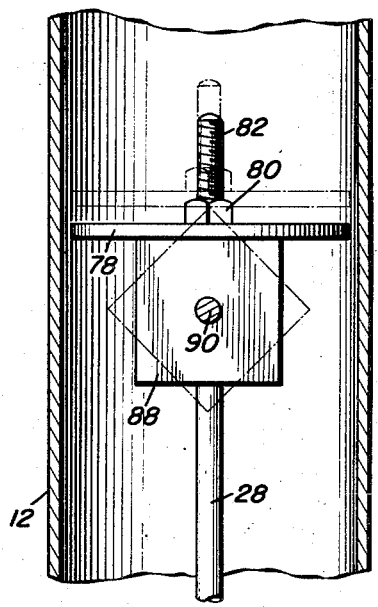
Fig. 6
Reuel W. Little
INVENTOR.

Aug. 27, 1957  R. W. LITTLE  2,803,924
TREE INJECTOR
Filed Jan. 4, 1955  2 Sheets-Sheet 2
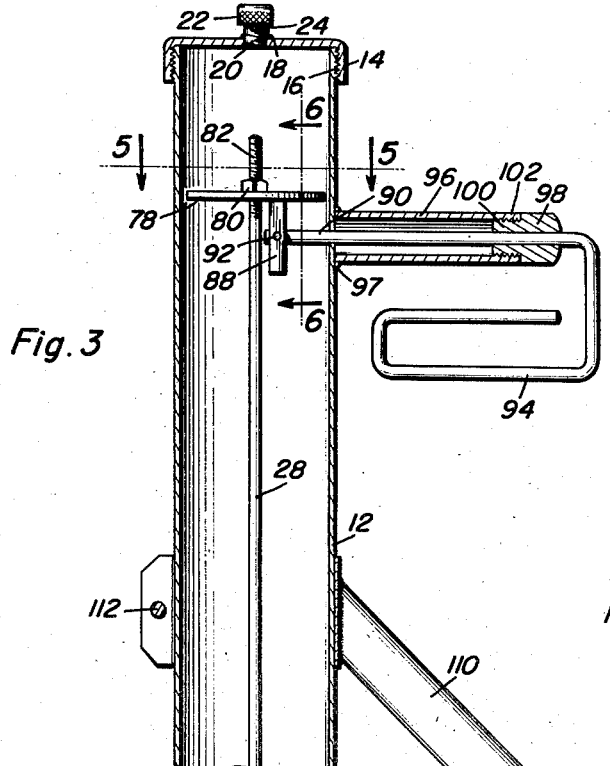
Fig. 3
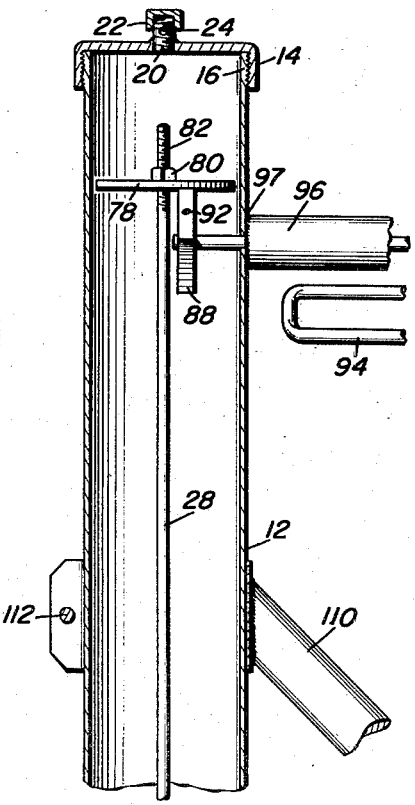
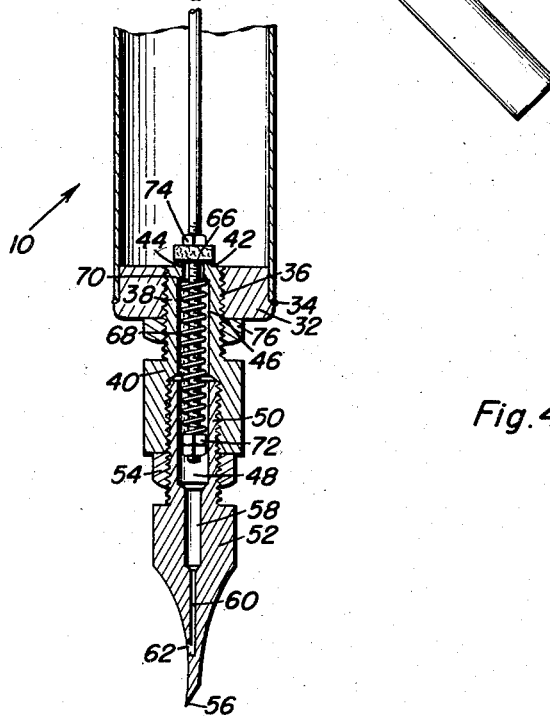
Fig. 4
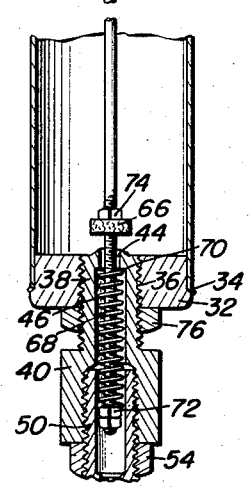
Reuel W. Little
INVENTOR.
BY *Clarence A. O'Brien*
*and Harvey B. Jacobson*
Attorneys

United States Patent Office

2,803,924
Patented Aug. 27, 1957

2,803,924

TREE INJECTOR

Reuel W. Little, Madill, Okla.

Application January 4, 1955, Serial No. 479,822

4 Claims. (Cl. 47—57.5)

This invention relates to a tree injector for treating a tree with any suitable fluid in order to keep the tree alive, for the purpose of making the tree grow, or for deadening the tree.

The principle of this tree injector is that it can be handily used to thrust through the outer bark of a tree or bush and into the inert bark making an indentation or pocket therein and simultaneously, by lightly tripping the valve with the handle, filling the indentation or pocket with fluid to deaden the tree, the fluid being stored in the barrel of the tree injector.

As is well known, the clearing of land is usually a considerable task. Trees are generally burned and the land is put into cultivation. During the years that follow, additional time and effort must be continuously expended in cutting the sprouts that rise from the root system of the trees which were burned. It is therefore the primary object of the present invention to provide means for killing the entire tree, including the root system, so as to prevent further sprouting of the tree after the land has been cleared.

A further object of the invention resides in the provision of a tree injector which may be used to easily and quickly deposit a suitable amount of fluid beneath the relatively hard outer bark of the tree and into a pocket formed in the inner bark or cambium of the tree. A plant hormone or the like may be applied so as to grow itself to death, or suitable poisonous substances may be utilized, as desired.

This invention may also be utilized in the care and treatment of trees so that trees which may be deficient in certain food elements may be supplied with suitable amounts thereof and substances of medicinal value to the trees may be easily injected therein.

The structure of this invention features an elongated barrel of considerable length, though light in weight, in which a valve body and blade are adjustably positioned. A novel valve mechanism including an elongated valve rod substantially confined within the barrel is provided for regulating and controlling flow of fluid from the barrel through a bore or passage in the blade.

Still further objects and features of this invention reside in the provision of a tree injector that is simple in construction, highly efficient in use, strong and durable, and which may be used even though there is extensive underbrush present at the location of a particular tree, yet which is inexpensive to manufacture, therefore permitting wide distribution and utilization.

These, together with the various ancillary objects and features of the invention which will become apparent as the following description proceeds, are attained by this tree injector, a preferred embodiment of which has been illustrated in the accompanying drawings, by way of example only, wherein:

Figure 1 is a side elevational view of the tree injector;
Figure 2 is a front elevational view of the tree injector;
Figure 3 is an enlarged vertical sectional view illustrating the tree injector illustrating the valve mechanism in a closed position;

Figure 4 is an enlarged vertical sectional view of the tree injector but illustrating the valve mechanism in an open position;

Figure 5 is an enlarged horizontal sectional view as taken along the plane of line 5—5 in Figure 3; and Figure 6 is a vertical sectional detail view in an enlarged scale as taken along the plane of line 6—6 in Figure 3 and illustrating the various positions of the valve mechanism.

By way of introduction to the description of the details, it may be mentioned that many of the parts to be hereinafter touched upon are disclosed in my prior Patent 2,770,920 of November 20, 1956.

With continuing reference to the accompanying drawings wherein like reference numerals designate similar parts throughout the various views, reference numeral 10 generally indicates the tree injector comprising the present invention. This tree injector includes an elongated tube or barrel 12 having an internally threaded hood section 14 which is threadedly secured on the external threads 16 of the barrel 12. Welded, as at 18 to the hood 14 is a threaded vent member 20 and a vent cap 22 is positioned thereon and adapted to be adjustably positioned with respect to the vent aperture 24 in the vent member 20. The vent member 20 is, of course, provided with a bore communicating with the vent aperture 24.

An elongated valve rod 28 is provided and is received and retained primarily within the barrel. The lower end of the barrel 12 has an annular or collar-like end member 32 welded, as at 34 thereto, and has an internally threaded aperture 36 therethrough for reception of the threaded neck-like end 38 of a valve body coupling 40. The valve body 40 is provided with a boss-like valve seat 42 through which an aperture 44 extends, the aperture opening into a bore or passage 46 which further communicates with a bore 48 in the threaded upper end 50 of a blade 52 which is threadedly received in the internally threaded socket portion of the valve body 40. A lock nut 54 is provided to adjustably lockingly hold the blade 52 in a selected angular position.

The blade 52 has an outwardly flared lower concave or dished portion 54 terminating in an arcuate axe-like cutting edge 56 and has a reduced bore 58 in communication with the recess 48 and with a further reduced bore 60 which extends to the outer surfaces of the blade, as at 62 (Fig. 3). A scoop portion 64 is formed adjacent the aperture 62 for permitting more efficient flow of fluid.

In order to control the flow of fluid from the barrel 12, the valve rod 28 is provided with a fiber disk or an equivalent valve member 66 which is normally urged into closing relationship relative to the valve seat 42 by a coil spring 68 mounted within the passage or bore 46 and engaging the wall 70 of the valve seat 44, and a shoulder forming tension adjusting nut 72 which is threadedly secured on the end of the valve rod. Further, the valve member 66 is adjustably held in position by means of a nut 74. A nut 76 is threadedly secured on the externally threaded neck portion 38 of the valve body 40 and lockingly holds the valve body 40 in an adjusted position.

Threadedly secured on the upper end of the valve rod 28 is a valve lifter disk 78. The valve lifter disk may be adjustably positioned and locked in place by means of a nut 80 on the threaded end 82 of the valve rod 28, the upper end of which is wholly contained within the barrel 12. The valve lifter disk 78 is engaged by a cam 88 for raising and lowering the disk 78 and hence the valve rod 28.

The cam 88 is substantially square in shape and is secured to a shaft 90 by means of a setscrew 92. The shaft 90 extends through a hole in the side wall of the barrel 12 and terminates in a return bend functioning as a handle 94 and used for rotating the shaft 90 and hence the cam 88. A sleeve-like mounting member or hand grip 96 is provided and may be welded, as at 97, or otherwise attached to the side walls of the barrel. A cap nut 98 forming a bearing mount for the handle 94 has a threaded neck portion 100 threadedly engaged in the internally threaded end 102 of the shaft mounting member 96.

Attached to the barrel 12 is a second hand-grip or handle 110 which is vertically slidably clamped, as at 112, about the barrel 12.

In operation, the tree injector is thrust into the outer bark of the tree. This forces the knife point to pierce the inner bark or cambium of the tree and make a small indentation or pocket therein. Simultaneously, the handle 94 may be lightly tripped to cause the valve rod 28 to rise, allowing flow of fluid from the barrel 12 through the aperture, as at 62 and into the pocket formed in the inner bark of the tree. This fluid will then either kill or treat the tree, depending upon the use of the tree injector.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A tree injector comprising a rigid elongated one-piece open-ended barrel, a closure cap for the upper end of said barrel having an attached manually regulable vent, an axially bored valve body removably mounted in the lower leading end of said barrel, a bark cleaving, penetrating, fluid dispensing, and applicating blade in axial alignment with said valve body and axially bored with the cooperating bores providing a fluid dispensing passage, the upper end of said valve body having a valve seat located in the lower end portion of said barrel, a valve rod having a lower end portion extending slidably through an opening in said seat and into the passage provided by the valve body and blade and provided with a coil spring confined in said passage and engaging the lower end of said valve rod at one end and, at its upper end, engaging said valve seat, a valve element adjustably mounted on an intermediate portion of said rod and cooperable with said seat, the intermediate and upper portion of said rod terminating wholly within the limits of said barrel, means carried by the upper end portion of said barrel and situated in part within the barrel and in part exteriorly of the barrel and serving to accommodate one hand of the user whereby he may readily lift and lower the rod to open and close the valve element, said means embodying a tubular sleeve-like hand-grip attached at its inner end to and extending radially beyond the exterior of said barrel and having a bearing at its outer end, said means also including a shaft rotatable in said hand-grip and bearing and provided at its outer end with finger-trip means paralleling and in close proximity to said hand-grip.

2. The structure defined in claim 1, and wherein said means also embodies a valve lifter disk adjustably and removably mounted on the upper end portion of said rod, the inner end portion of said shaft extending into said barrel in close proximity to said disk, and a cam carried by said inner end portion and having operable wiping contact with said lifter disk.

3. The structure defined in claim 2 and a second hand-grip is adjustably mounted on the barrel above the blade and below the first-named hand-grip disposed at an angle oblique to the long axis of said barrel and inclining outwardly and downwardly.

4. A tree injector comprising an elongated barrel vented at its upper end, cutter blade means removably mounted on the lower leading end of the barrel and embodying a valve seat, a valve rod extending into and confined primarily within the limits of said barrel and provided on its lower end with a valve element which is spring-pressed and engageable with said seat, a valve lifting disk mounted on the upper end of said rod, a tubular hand-grip provided with a bearing and joined to the upper end portion of the barrel below the extreme upper end and radiating therefrom and having a bearing, a rocker shaft having an end portion mounted for oscillation in said bearing and provided on its outer end with a finger-trip in close spaced proximity and parallel to said hand-grip, the inner end of said shaft extending into said barrel and being provided with a square cam having wiping contact with said valve lifter disk, and a rigid downwardly and outwardly inclined hand-grip slidably and rotatably mounted on said barrel and normally located beneath said first-named hand-grip and cooperating therewith and being disposed at an angle which is oblique to the longitudinal axis of the barrel.

References Cited in the file of this patent

UNITED STATES PATENTS

| | | |
|---|---|---|
| 433,849 | Burbeck | Aug. 5, 1890 |
| 887,275 | Rumpel | May 12, 1908 |
| 1,407,689 | Batterson | Feb. 28, 1922 |
| 2,770,920 | Little | Nov. 20, 1956 |

FOREIGN PATENTS

| | | |
|---|---|---|
| 14,994 | Australia | of 1909 |
| 8,462 | Australia | of 1913 |
| 28,808 | Australia | of 1930 |
| 9,555 | Great Britain | of 1892 |